US012794003B2

(12) United States Patent
Lee et al.

(10) Patent No.: US 12,794,003 B2
(45) Date of Patent: Nov. 10, 2026

(54) ELECTRODE ASSEMBLY AND MANUFACTURING METHOD OF THE SAME

(71) Applicant: LG ENERGY SOLUTION, LTD., Seoul (KR)

(72) Inventors: Kwanhee Lee, Daejeon (KR); Duk Hyun Ryu, Daejeon (KR); Sue Jin Kim, Daejeon (KR); Jinsu Jang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 669 days.

(21) Appl. No.: 18/269,439

(22) PCT Filed: Jan. 28, 2022

(86) PCT No.: PCT/KR2022/001555
§ 371 (c)(1),
(2) Date: Jun. 23, 2023

(87) PCT Pub. No.: WO2022/164250
PCT Pub. Date: Aug. 4, 2022

(65) Prior Publication Data

US 2024/0079633 A1 Mar. 7, 2024

(30) Foreign Application Priority Data

Jan. 28, 2021 (KR) ........................ 10-2021-0012400
Jan. 27, 2022 (KR) ........................ 10-2022-0012250

(51) Int. Cl.
*H01M 10/0587* (2010.01)
*H01M 4/13* (2010.01)
*H01M 10/04* (2006.01)

(52) U.S. Cl.
CPC ............................... *H01M 10/0431* (2013.01)

(58) Field of Classification Search
None
See application file for complete search history.

(56) References Cited

U.S. PATENT DOCUMENTS

2012/0321924 A1 12/2012 Ahn
2013/0108903 A1* 5/2013 Martin ................ H01M 50/179
29/730

(Continued)

FOREIGN PATENT DOCUMENTS

CN 203250828 U 10/2013
CN 104511938 A 4/2015

(Continued)

OTHER PUBLICATIONS

English translation of KR 2017/0043240 (Year: 2017).*

(Continued)

*Primary Examiner* — Yoshitoshi Takeuchi
(74) *Attorney, Agent, or Firm* — Morgan, Lewis & Bockius LLP

(57) ABSTRACT

An electrode assembly includes an anode; a cathode; and a separator between the anode and the cathode rolled together. The anode includes an anode current collector and an anode active material portion applied onto the anode current collector, and the cathode includes a cathode current collector and a cathode active material portion applied onto the cathode current collector. An anode uncoated portion of the anode current collector at which the anode active material is not applied extends in a first direction, and a cathode uncoated portion of the cathode current collector at which the cathode active material is not applied extends in an opposite direction. The cathode active material portion includes a loading reduction portion in which a loading amount of the cathode active material is smaller than that of (Continued)

an adjacent region. The loading reduction portion is at one end part of the cathode in the first direction.

12 Claims, 14 Drawing Sheets

(56) References Cited

U.S. PATENT DOCUMENTS

| | | | | |
|---|---|---|---|---|
| 2016/0043358 | A1 | 2/2016 | Joo | |
| 2016/0181650 | A1* | 6/2016 | Ide | H01M 10/0525 429/211 |
| 2016/0260978 | A1* | 9/2016 | Fujii | H01M 50/531 |
| 2017/0110721 | A1 | 4/2017 | Nagai | |
| 2017/0373299 | A1* | 12/2017 | Takeda | H01M 4/0416 |
| 2018/0315991 | A1* | 11/2018 | Kim | H01M 4/0402 |
| 2018/0366786 | A1 | 12/2018 | Fujii | |
| 2020/0381769 | A1* | 12/2020 | Kita | H01M 4/13 |

FOREIGN PATENT DOCUMENTS

| | | | | |
|---|---|---|---|---|
| CN | 109088091 | A | 12/2018 | |
| CN | 112018447 | A | 12/2020 | |
| JP | 2009-164061 | A | 7/2009 | |
| JP | 2020-194732 | A | 12/2020 | |
| KR | 10-2006-0022358 | A | 3/2006 | |
| KR | 10-1252969 | B1 | 4/2013 | |
| KR | 10-1318569 | B1 | 10/2013 | |
| KR | 10-2015-0122940 | A | 11/2015 | |
| KR | 10-2016-0018170 | A | 2/2016 | |
| KR | 10-2017-0043240 | A | 4/2017 | |
| KR | 2017/0043240 | * | 4/2017 | H01M 10/04 |
| KR | 10-1802102 | B1 | 11/2017 | |
| KR | 10-2082467 | B1 | 2/2020 | |
| KR | 10-2124105 | B1 | 6/2020 | |
| WO | 2016-121734 | A1 | 8/2016 | |
| WO | 2020067378 | A1 | 4/2020 | |
| WO | 2020067379 | A1 | 4/2020 | |

OTHER PUBLICATIONS

Extended European Search Report dated Sep. 18, 2024 issued in European Patent Application No. 22746276.9. Note: KR 10-2017-0043240 A, JP 2020-194732 A, and KR 10-2006-0022358 A cited therein are already of record.

Office Action dated Sep. 2, 2024 issued in Japanese Patent Application No. 2023-541995. Note: KR 10-2017-0043240 A, KR 10-2015-0122940 A, JP 2020-194732 A, and KR 10-2006-0022358 A cited therein are already of record.

International Search Report issued May 10, 2022 in the corresponding International Patent Application No. PCT/KR2022/001555.

Office Action and Search Report dated Jun. 11, 2026 issued in the corresponding Chinese Patent Application No. 202280009524.X. (Note: KR 10-2017-0043240 A previously filed.).

* cited by examiner

100

ELECTRODE ASSEMBLY AND MANUFACTURING METHOD OF THE SAME

CROSS CITATION WITH RELATED APPLICATION(S)

This application claims the benefit of Korean Patent Application No. 10-2021-0012400 filed on Jan. 28, 2021 and Korean Patent Application No. 10-2022-0012250 filed on Jan. 27, 2022 in the Korean Intellectual Property Office, the entire contents of which are incorporated herein by reference.

TECHNICAL FIELD

The present disclosure relates to an electrode assembly and a manufacturing method of the same, and more particularly to an electrode assembly having with improved energy density and a manufacturing method of the same.

BACKGROUND

Recently, the demand for portable electronic products such as notebooks, video cameras, cellular phones or the like has rapidly increased, and electric vehicles, energy storage batteries, robots, satellites or the like have been actively developed. Thereby, many studies have been conducted on the secondary battery used as its driving power source.

The secondary battery includes, for example, a nickel cadmium battery, a nickel hydrogen battery, a nickel zinc battery, a lithium secondary battery, and the like. Among them, the lithium secondary batteries are widely used in the field of high-tech electronic devices because they have advantages, for example, hardly exhibiting memory effects in comparison with nickel-based secondary batteries and thus being freely charged and discharged, and having very low self-discharge rate, high operating voltage and high energy density per unit weight.

Depending on the shape of the battery case, a secondary battery is classified into a cylindrical battery where an electrode assembly is mounted in a cylindrical metal can, a prismatic battery where an electrode assembly is mounted in a prismatic metal can, and a pouch-type battery where an electrode assembly is mounted into a pouch type case formed of an aluminum laminate sheet. Among them, the cylindrical battery has an advantage that it has a relatively large capacity and is structurally stable.

The electrode assembly mounted in the battery case is an electricity-generating device enabling charge and discharge that has a cathode/separator/anode laminate structure, and is classified into a jelly-roll type, a stack type, and a stack/folding type. The jelly-roll type is a shape in which a separator interposed between a cathode and an anode, each made of an active material-coated long sheet, is rolled, the stack type is a shape in which a plurality of cathodes and a plurality of anodes each having a predetermined size are laminated in this order such that a separator is interposed therebetween, and a stack/folding type is a combination of a jelly-roll type and a stack type. Of these, the jelly-roll-type electrode assembly has advantages that manufacture is easy and the energy density per weight is high.

Recently, in order to realize high energy density and reduce costs, development is progressing in the direction of increasing the size of the battery cell. As the energy increases in accordance with the size of the battery cell, the resistance per battery cell should decrease. In order to reduce resistance, a method of using an electrode current collector of an electrode as an electrode tab can be used instead of a method of attaching an electrode tab to an electrode. At this time, due to the characteristics of the electrode manufacturing process of applying the electrode slurry onto the electrode current collector, a portion in which the loading amount is reduced occurs at the boundary portion between the anode active material portion applied with an anode slurry and the anode current collector. Considering the N/P ratio, metallic lithium may be precipitated on the cathode active material portion facing the portion where the loading amount is reduced. Here, the N/P ratio is a value that is obtained by dividing the capacity of the anode calculated in consideration of the area and capacity per mass of the anode by the capacity of the cathode obtained in consideration of the area and capacity per mass of the cathode, and it generally has a value of 1 or more. That is, the anode is manufactured to have a large capacity. For reference, if the N/P ratio is less than 1, metallic lithium is easily precipitated during charging and discharging, which acts as a cause of rapidly deteriorating the safety of the battery during high-rate charging and discharging. In other words, the N/P ratio has a significant effect on the safety and capacity of the battery.

Due to concerns about the precipitation of metallic lithium as described above, the cathode active material portion cannot be positioned on the cathode portion facing the portion in which the loading amount of the anode is reduced. This is a cause of failure to increase the energy density of the battery cell.

DETAILED DESCRIPTION OF THE INVENTION

Technical Problem

It is an object of the present disclosure to provide an electrode assembly having improved energy density by extending the section of the cathode active material portion, and a manufacturing method of the same.

However, the problem to be solved by the embodiments of the present disclosure is not limited to the above-described problems, and can be variously expanded within the scope of the technical idea included in the present disclosure.

Technical Solution

According to an embodiment of the present disclosure, there is provided an electrode assembly comprising: an anode; a cathode; and a separator disposed between the anode and the cathode, wherein the anode, the cathode and the separator are rolled together to form a jelly-roll structure, wherein the anode includes an anode current collector and an anode active material portion formed by applying an anode active material onto the anode current collector, wherein the cathode includes a cathode current collector and a cathode active material portion formed by applying a cathode active material onto the cathode current collector, wherein an anode uncoated portion, to which the anode active material is not applied among the anode current collector, extends in a first direction, wherein a cathode uncoated portion, to which the cathode active material is not applied among the cathode current collector, extends in a second direction opposite to the first direction, wherein the cathode active material portion includes a loading reduction portion in which the loading amount of the cathode active material is smaller than that of the adjacent region, and wherein the loading reduction portion is disposed at one end part of the cathode in the first direction.

The anode active material portion may be disposed at a portion corresponding to the loading reduction portion based on a direction perpendicular to the first direction.

The anode active material portion may include an anode boundary portion forming a boundary between the anode active material portion and the anode uncoated portion, and the anode boundary portion may be disposed at a portion corresponding to the loading reduction portion, based on a direction perpendicular to the first direction.

The loading reduction portion may be formed such that the loading amount of the cathode active material gradually decreases as it goes in the first direction.

The first direction and the second direction may be directions parallel to the height direction of the jelly roll structure.

The anode uncoated portion may be extended more than the separator in the first direction, and the cathode uncoated portion may be extended more than the separator in the second direction.

The electrode assembly may further comprise an insulating layer formed on at least one of the anode and the cathode. The insulating layer formed on the anode may cover at least a part of the anode uncoated portion and the anode active material portion, and the insulating layer formed on the cathode may cover at least a part of the cathode uncoated portion and the cathode active material portion.

The insulating layer formed on the anode may be formed so as to cover an end part of the anode active material portion along the first direction and a part of the anode uncoated portion adjacent thereto. The insulating layer formed on the cathode may be formed so as to cover an end part of the cathode active material portion along the second direction and a part of the cathode uncoated portion adjacent thereto.

The insulating layer formed on the anode may be disposed at a place that does not overlap with the loading reduction portion, based on a direction perpendicular to the first direction.

At least partial sections of the anode uncoated portion and the cathode uncoated portion may be processed in the form of a plurality of segment pieces that can be bent independently of each other.

According to another embodiment of the present disclosure, there is provided a method for manufacturing an electrode assembly, the method comprising the steps of: manufacturing an anode sheet such that an anode active material portion applied with an anode active material and an anode uncoated portion not applied with an anode active material are alternately disposed on an anode current collector; manufacturing a cathode sheet such that a cathode active material portion applied with a cathode active material and a cathode uncoated portion not applied with a cathode active material are alternately disposed on a cathode current collector; slitting the anode uncoated portion and the anode active material portion to manufacture an anode; slitting the cathode uncoated portion and the cathode active material portion to manufacture a cathode; and rolling the anode and the cathode together with a separator to form a jelly roll structure, wherein the cathode sheet includes a loading reduction region in which the loading amount of the cathode active material is smaller than that of the adjacent region, wherein in the step of manufacturing the cathode, the loading reduction region is slitted, and wherein the slitted loading reduction region forms a loading reduction portion in which the loading amount of the cathode active material is smaller than that of an adjacent region in the jelly roll structure.

In the jelly roll structure, the anode uncoated portion may be extended in a first direction, and the cathode uncoated portion may be extended in a second direction opposite to the first direction.

The loading reducing portion may be disposed at one end part of the cathode in the first direction.

The loading reducing portion may be formed such that the loading amount of the cathode active material gradually decreases as it goes in the first direction.

In the jelly roll structure, the anode active material portion may be positioned at a portion corresponding to the loading reduction portion based on a direction perpendicular to the first direction.

The anode active material portion may include an anode boundary portion forming a boundary between the anode active material portion and the anode uncoated portion, and in the jelly roll structure, the anode boundary portion may be positioned at a portion corresponding to the loading reduction portion based on a direction perpendicular to the first direction.

The loading amount of the cathode active material may gradually decrease as it goes toward the central part of the loading reduction region, and in the step of manufacturing the cathode, the loading reduction portion may be provided by slitting the central part of the loading reduction region.

Advantageous Effects

According to embodiments of the present disclosure, by providing a loading reduction portion in which the loading amount of the cathode active material is small than that of the adjacent region on the cathode, the section of the cathode active material portion can be increased without concerns about deposition of lithium. Thereby, the energy density of the electrode assembly can be improved.

The effects of the present disclosure are not limited to the effects mentioned above and additional other effects not described above will be clearly understood from the description of the appended claims by those skilled in the art.

DETAILED DESCRIPTION OF THE EMBODIMENTS

Figure 1:
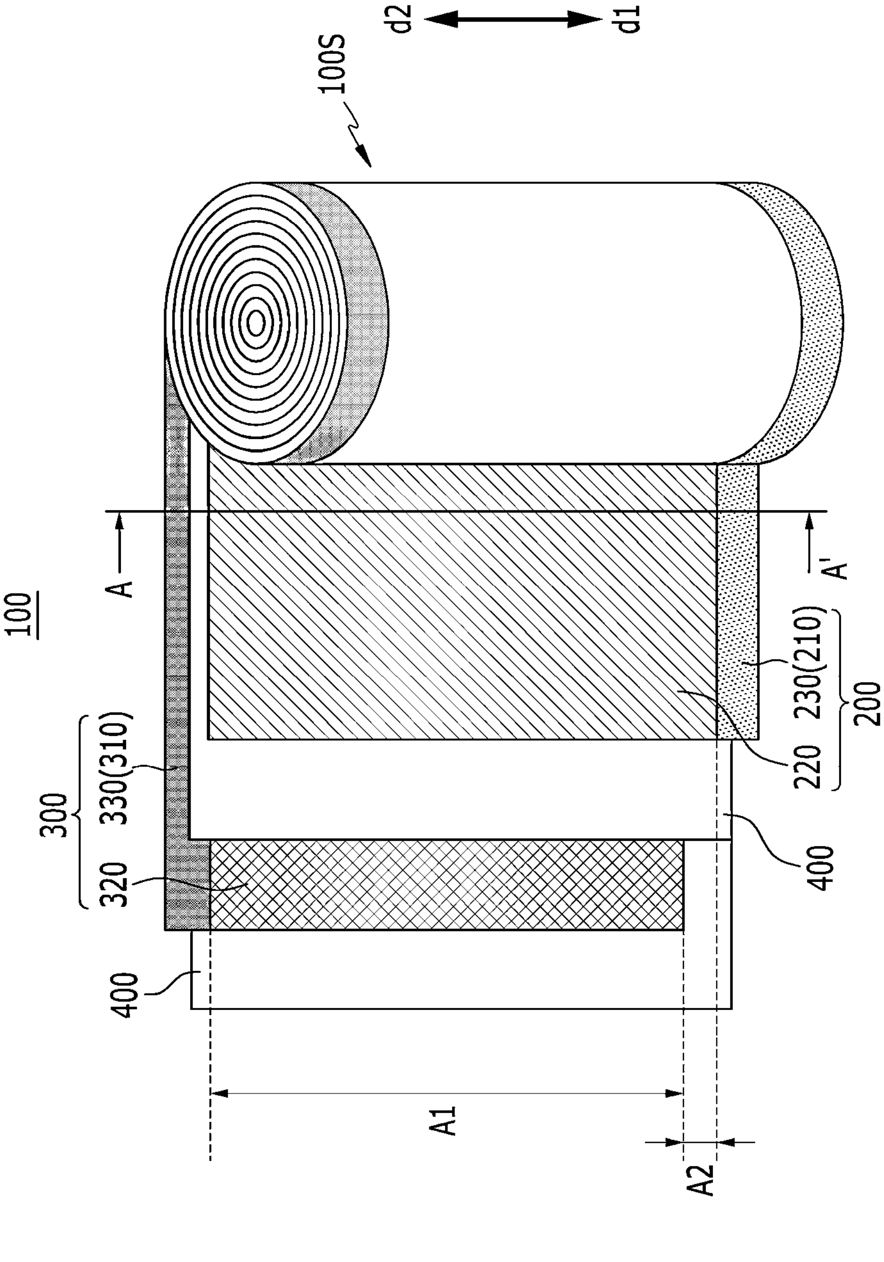
FIG. 1 is a diagram showing an electrode assembly according to an embodiment of the present disclosure.

Hereinafter, various embodiments of the present disclosure will be described in detail with reference to the accompanying drawings so that those skilled in the art can easily carry out them. The present disclosure may be modified in various different ways, and is not limited to the embodiments set forth herein.

Portions that are irrelevant to the description will be omitted to clearly describe the present disclosure, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means arranged on or below a reference portion, and does not necessarily mean being arranged on the upper end of the reference portion toward the opposite direction of gravity.

Further, throughout the description, when a portion is referred to as "including" or "comprising" a certain component, it means that the portion can further include other components, without excluding the other components, unless otherwise stated.

Further, throughout the description, when referred to as "planar", it means when a target portion is viewed from the upper side, and when referred to as "cross-sectional", it means when a target portion is viewed from the side of a cross section cut vertically.

Figure 2:
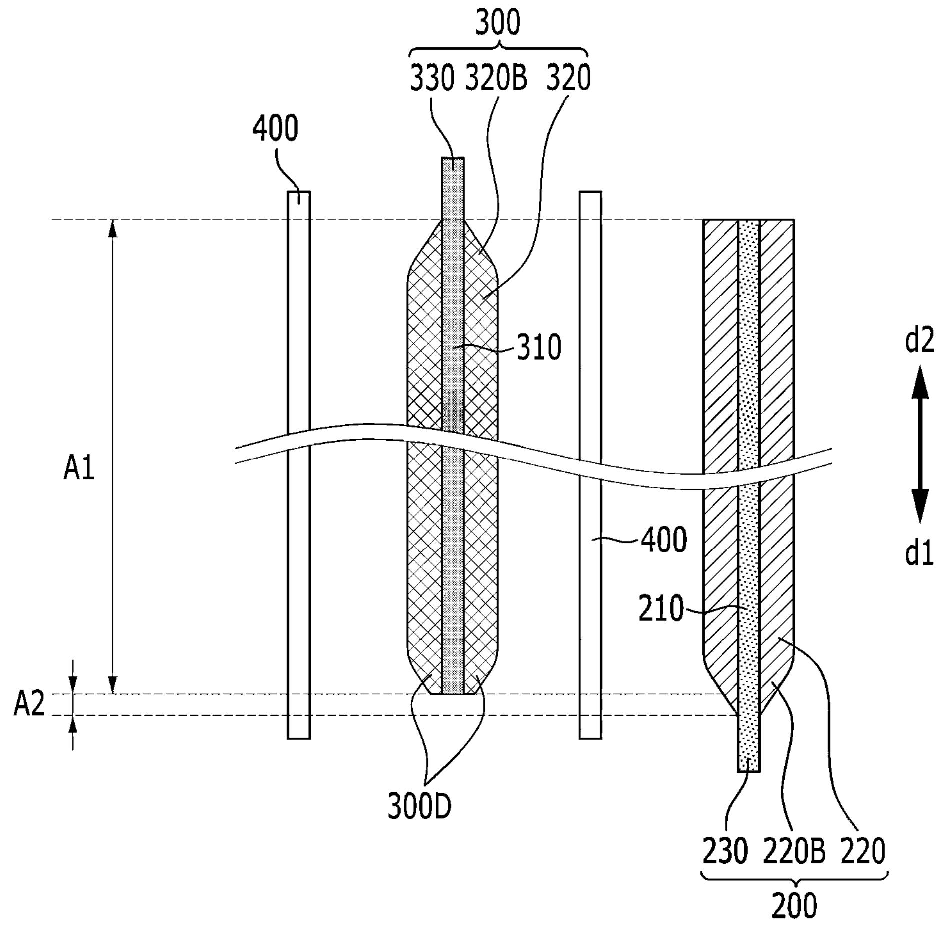
FIG. 2 is a cross-sectional view showing a cross section taken along the cutting line A-A' of FIG. 1.

FIG. 1 is a diagram showing an electrode assembly according to an embodiment of the present disclosure, and FIG. 2 is a cross-sectional view showing a cross section taken along the cutting line A-A' of FIG. 1.

Referring to FIGS. 1 and 2, the electrode assembly 100 according to an embodiment of the present disclosure includes an anode 200, a cathode 300 and a separator 400. The separator 400 is disposed between the anode 200 and the cathode 300. The anode 200, the cathode 300 and the separator 400 are rolled together to form a jelly roll structure 100S. Here, the jelly roll structure 100S refers to a structure formed by rolling the anode 200, the cathode 300 and the separator 400. In addition, when the jelly roll structure 100S is formed, it is preferable that a separator 400 is further arranged on the outer side in order to prevent the anode 200 and the cathode 300 from contacting each other.

The anode 200 includes an anode current collector 210 and an anode active material portion 220 formed by applying an anode active material onto the anode current collector 210. In particular, as illustrated, the anode active material can be applied onto both surfaces of the anode current collector 210 to form an anode active material portion 220. Further, the anode uncoated portion 230 to which the anode active material is not applied among the anode current collector 210 is extended in the first direction d1. The anode uncoated portion 230 continues along one end part of the rolled anode 200. Further, the anode uncoated portion 230 extends more than the separator 400 in the first direction d1. Thereby, the anode uncoated portion 230 can be exposed at one end part of the jelly roll structure 100S in the first direction.

The cathode 300 includes a cathode current collector 310 and a cathode active material portion 320 formed by applying a cathode active material onto a cathode current collector 310. In particular, as illustrated, the cathode active material can be applied onto both surfaces of the cathode current collector 310 to form a cathode active material portion 320. Further, the cathode uncoated portion 330 to which the cathode active material is not applied among the cathode current collector 310 is extended in the second direction d2. The cathode uncoated portion 330 continues along one end part of the rolled cathode 300. Further, the cathode uncoated portion 330 extends more than the separator 400 in the second direction d2. Thereby, the cathode uncoated portion 330 can be exposed at one end part of the jelly roll structure 100S in the second direction.

Here, the first direction d1 and the second direction d2 are directions facing each other. Further, the first direction d1 and the second direction d2 may be directions parallel to the height direction of the jelly roll structure 100S.

The electrode assembly 100 according to the present embodiment is not in the form of attaching a separate electrode tab, but has a shape in which the anode uncoated portion 230 of the anode current collector 210 and the cathode uncoated portion 330 of the cathode current collector 310 themselves are used as electrode tabs in order to reduce resistance. That is, the electrode assembly 100 according to the present embodiment has a kind of tab-less structure, and the anode uncoated portion 230 and the cathode uncoated portion 330 may be defined as electrode tabs by themselves.

At this time, the cathode active material portion 320 according to the present embodiment includes a loading reduction portion 300D having a smaller loading amount of the cathode active material than in the adjacent region, and the loading reduction portion 300D is disposed at one end part of the cathode 300 in the first direction d1. Further, more specifically, the loading reduction portion 300D may be formed such that the loading amount of the cathode active material gradually decreases as it goes in the first direction d1.

Here, the loading amount means the application amount of the active material per unit area. In a portion with a large loading amount, a large amount of an anode active material or a cathode active material is applied to a unit area, so that the thickness of the anode active material portion or the cathode active material portion can be relatively thick. In the portion with a small loading amount, a small amount of an anode active material or a cathode active material is applied to a unit area, so that the thickness of the anode active material portion or the cathode active material portion can be relatively thin.

An active material portion can be formed by applying a slurry containing an active material. In such a process, a boundary portion in which the loading amount gradually decreases may be formed between the uncoated portion and the active material portion.

Specifically, the anode active material portion 220 may include an anode boundary portion 220B forming a boundary between the anode active material portion 220 and the anode uncoated portion 230. The anode boundary portion 220B may be formed such that the loading amount decreases toward a direction in which the anode uncoated portion 230 is positioned.

Similarly, the cathode active material portion 320 may include a cathode boundary portion 320B forming a boundary between the cathode active material portion 320 and the cathode uncoated portion 330. The cathode boundary portion 320B may be formed such that the loading amount decreases as it goes toward a direction in which the cathode uncoated portion 330 is positioned.

As described above, the anode boundary portion 220B or the cathode boundary portion 320B in which the loading amount gradually decreases is naturally generated in the process of applying the slurry containing the active material to the anode current collector 210 or the cathode current collector 310.

Specifically, the anode boundary portion 220B and the cathode boundary portion 320B may be regions where a sliding phenomenon occurs. The sliding phenomenon means a phenomenon in which an electrode active material is less applied in the boundary region of the slurry application due to the spreading of a slurry containing active materials, so that the slurry in the application boundary region has an approximately inclined shape. Here, when the electrode is entirely dried, as the solvent contained in the slurry evaporates and the volume of the slurry decreases, a sliding phenomenon can be further deepened near the boundary between the region applied with the active material and the region not applied with the active material.

At this time, the amount of the cathode active material may be smaller than the amount of the anode active material in the region corresponding to the cathode boundary portion 320B, based on the direction perpendicular to the second direction d2. Even so, since this has a value of N/P ratio greater than 1, a problem of precipitating metallic lithium does not occur.

The problem is the region corresponding to the anode boundary portion 220B. Based on the direction perpendicular to the first direction d1, in the region corresponding to the anode boundary portion 220B, the amount of the anode active material may be smaller than the amount of the cathode active material. At this time, since the N/P ratio has a value less than 1, a problem of precipitating metallic lithium may occur.

Therefore, in the present embodiment, a loading reduction portion 300D is provided on the cathode 300, and based on a direction perpendicular to the first direction d1, the anode active material portion 220 may be positioned at a portion corresponding to the loading reduction portion 300D. More specifically, based on a direction perpendicular to the first direction d1, the anode boundary portion 220B may be disposed at a portion corresponding to the loading reduction portion 300D.

A loading reduction portion 300D in which the loading amount of the cathode active material is smaller than the adjacent region is provided at a position corresponding to the anode boundary portion 220B where the loading amount gradually decreases, thereby capable of increasing the section applied with the cathode active material without concerns about precipitation of lithium. In particular, in order to correspond to the shape of the anode boundary portion 220B in which the loading amount gradually decreases toward the direction in which the anode uncoated portion 230 is positioned, the loading reduction portion 300D may have a shape in which the loading amount of the cathode active material gradually decreases as it goes in the first direction d1. Therefore, the N/P ratio for the anode 200 and the cathode 300 can be maintained high in the region where the anode boundary portion 220B is formed, thereby preventing precipitation of lithium. More details will be described later through comparison with the comparative examples of FIGS. 9 to 12.

Next, a method of manufacturing an electrode assembly according to an embodiment of the present disclosure will be described in detail with reference to FIGS. 3 to 8.

Figure 3:
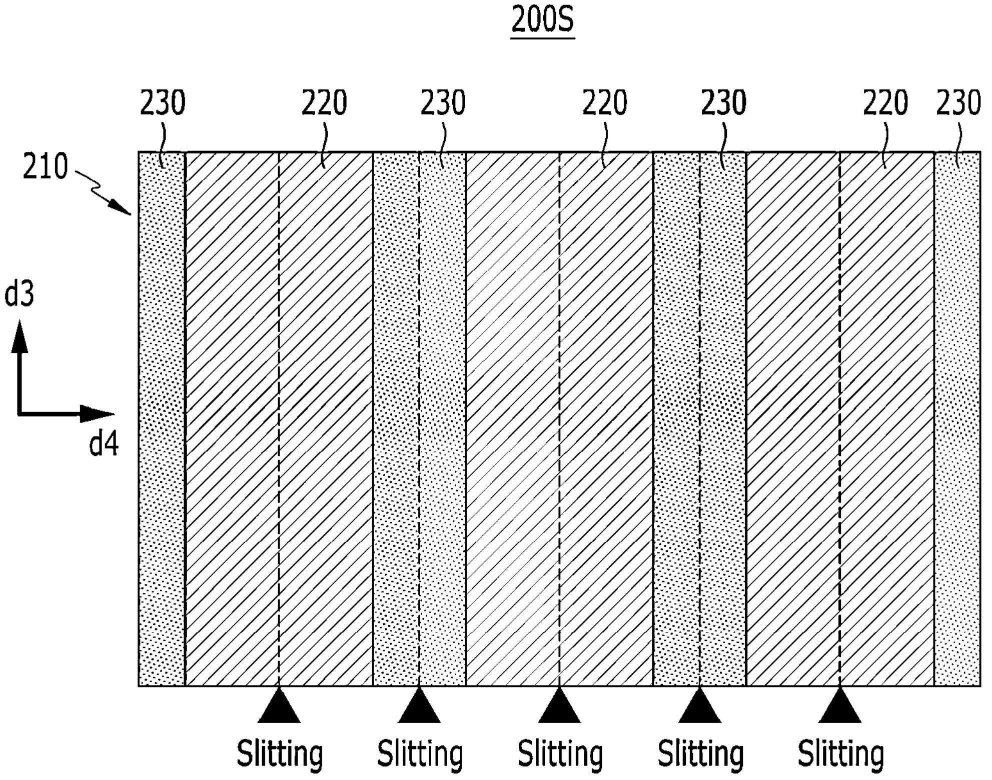
FIGS. 3 and 4 are diagrams showing a state in which an anode is manufactured according to an embodiment of the present disclosure.
Figure 4:
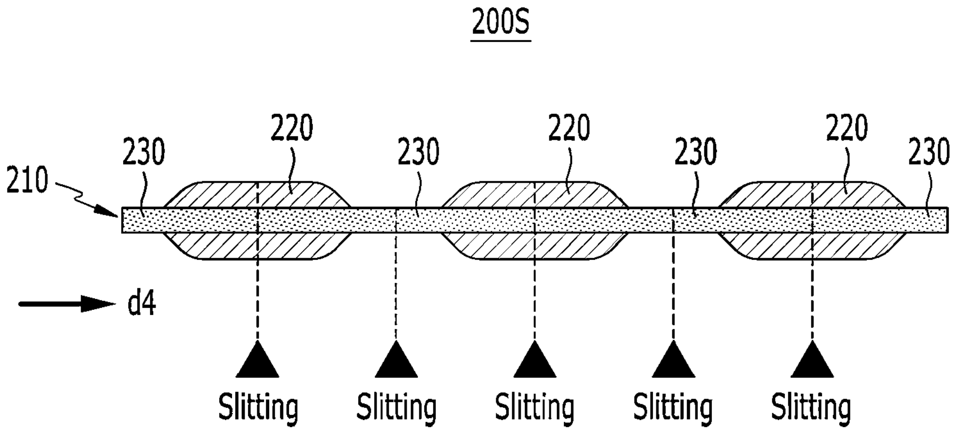

FIGS. 3 and 4 are diagrams showing a state in which an anode is manufactured according to an embodiment of the present disclosure. Specifically, FIG. 3 is a plan view of the anode sheet as viewed from above, and FIG. 4 is a front view of the anode sheet of FIG. 3 as viewed from the front.

Referring to FIGS. 3 and 4, the method of manufacturing an electrode assembly according to an embodiment of the present disclosure includes a step of manufacturing the anode sheet 200S such that the anode active material portion 220 applied with the anode active material and the anode uncoated portion 230 not applied with the anode active material are alternately disposed on the anode current collector 210.

Specifically, the anode active material portion 220 may be formed by applying the anode active material so as to continue along the third direction d3, and a plurality of anode active material portions 220 may be disposed separately from each other in a fourth direction d4 perpendicular to the third direction d3. That is, the anode uncoated portion 230 can be positioned to between the plurality of anode active material portions 220.

Here, the third direction d3 and the fourth direction d4 are directions for mainly describing the anode sheet 200S, and are directions unrelated to the first direction d1 and the second direction d2 in the jelly roll structure 100S described above.

Figure 5:
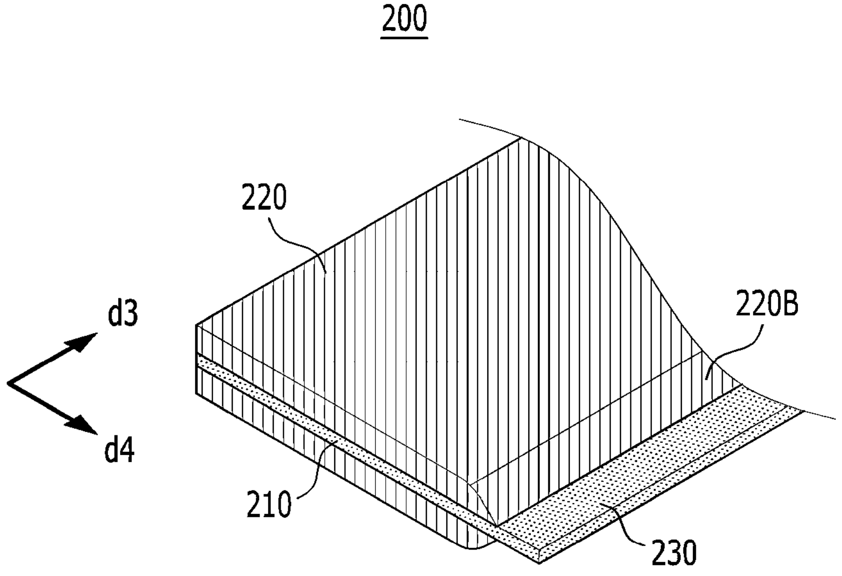
FIG. 5 is a perspective view showing an anode according to an embodiment of the present disclosure.

Then, a step of slitting the anode uncoated portion 230 and the anode active material portion 220 to manufacture the anode 200 may be followed. FIG. 5 is a perspective view showing an anode according to an embodiment of the present disclosure.

Referring to FIGS. 3 to 5, slitting can be performed on each of the anode uncoated portion 230 and the anode active material portion 220 in a direction parallel to the third direction d3. Thereby, a plurality of anodes 200 as shown in FIG. 5 can be manufactured from the anode sheet 200S. That is, the anode 200 of FIG. 5 corresponds to one of several anodes manufactured by slitting the anode sheet 200S of FIGS. 3 and 4. By slitting the anode uncoated portion 230 and the anode active material portion 220 of the anode sheet 200S, respectively, the anode 200 in which the anode uncoated portion 230 is extended on one side can be manufactured.

When the anode active material portion 220 is formed, a slurry containing the anode active material can be applied onto the anode current collector 210. In this slurry application process, at the boundary between the anode active material portion 220 and the anode uncoated portion 230, the anode boundary portion 220B may be formed in which the loading amount decreases as it goes toward the direction in which the anode uncoated portion 230 is positioned.

Figure 6:
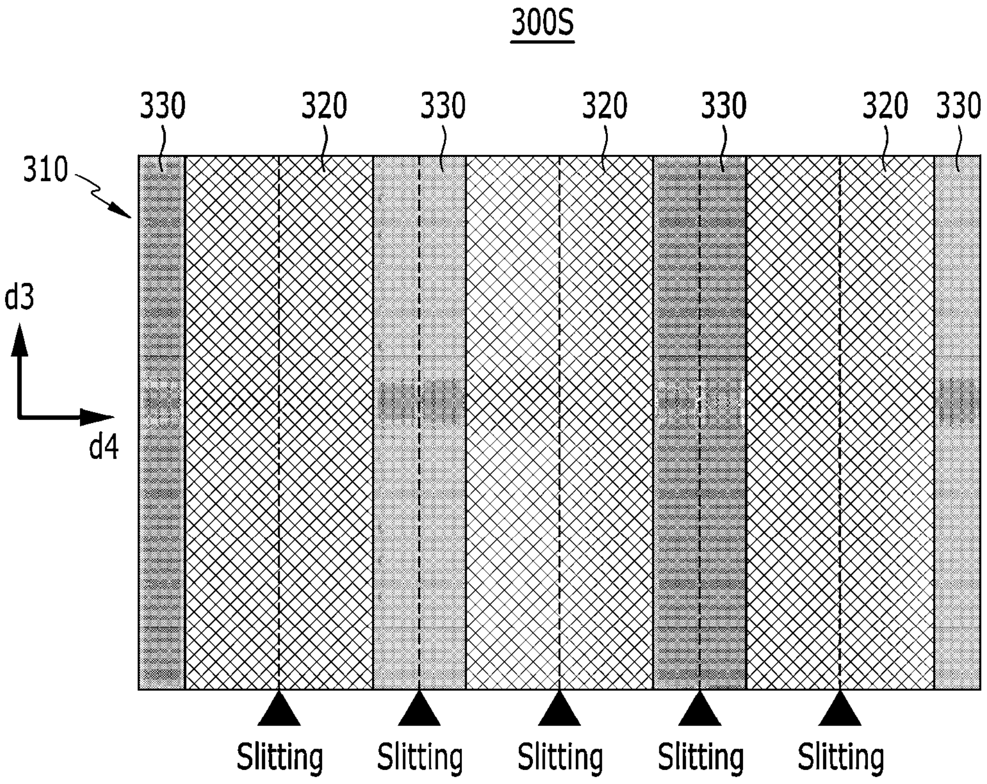
FIGS. 6 and 7 are diagrams showing a state in which a cathode is manufactured according to an embodiment of the present disclosure.
Figure 7:
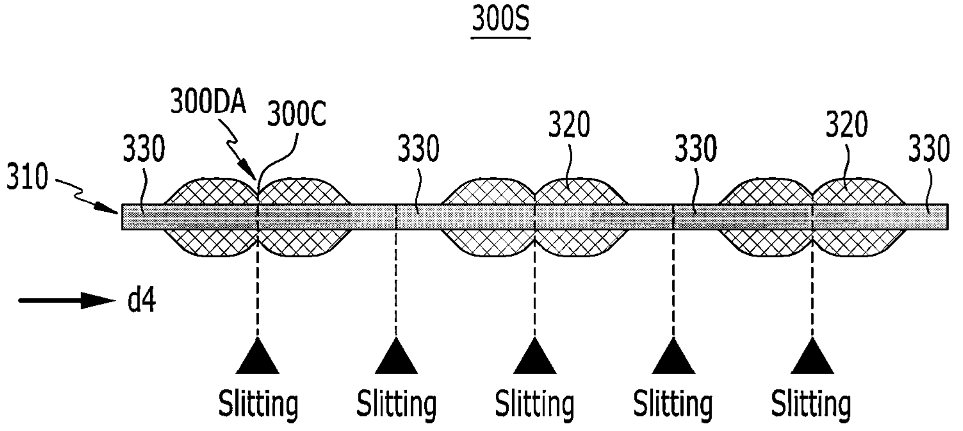

FIGS. 6 and 7 are diagrams showing a state in which a cathode is manufactured according to an embodiment of the present disclosure. Specifically, FIG. 6 is a plan view of the cathode sheet as viewed from above, and FIG. 7 is a front view of the cathode sheet of FIG. 6 as viewed from the front.

Referring to FIGS. 6 and 7, the method of manufacturing an electrode assembly according to an embodiment of the present disclosure includes a step of manufacturing a cathode sheet 300S such that a cathode active material portion 320 applied with a cathode active material and a cathode uncoated portion 330 not applied with a cathode active material are alternately disposed on the cathode current collector 310.

Specifically, the cathode active material portion 320 can be formed by applying the cathode active material so as to continue along the third direction d3, and a plurality of cathode active material portions 320 may be disposed separately from each other in a fourth direction d4 perpendicular to the third direction d3. That is, the cathode uncoated portion 330 may be positioned between the plurality of cathode active material portions 320.

Here, the third direction d3 and the fourth direction d4 are directions for mainly describing the cathode sheet 300S, and are directions unrelated to the first direction d1 and the second direction d2 in the jelly-roll structure 100S described above.

Figure 8:
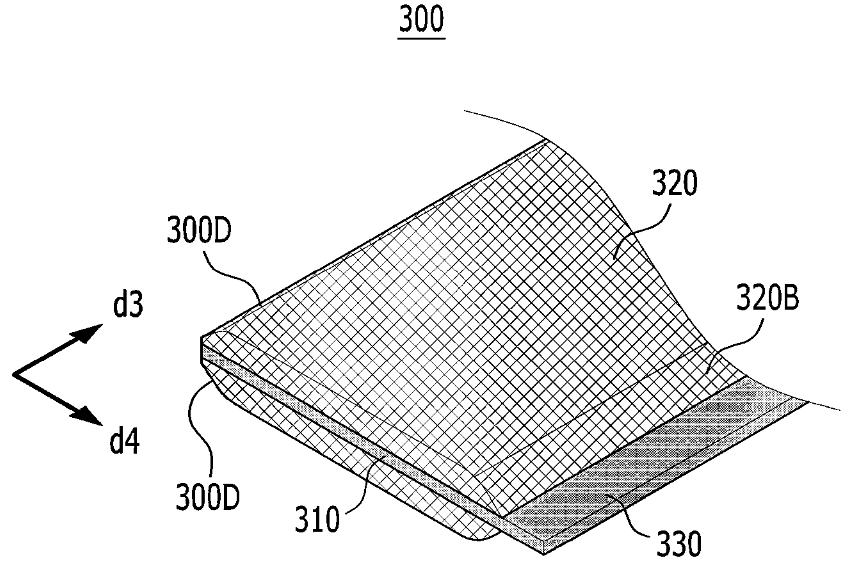
FIG. 8 is a perspective view showing a cathode according to an embodiment of the present disclosure.

Then, a step of slitting the cathode uncoated portion 330 and the cathode active material portion 320 to manufacture the cathode 300 may be followed. FIG. 8 is a perspective view showing a cathode according to an embodiment of the present disclosure.

Referring to FIGS. 6 to 8, slitting may be performed on each of the cathode uncoated portion 330 and the cathode active material portion 320 in a direction parallel to the third direction d3 as indicated by dashed lines in FIGS. 6 and 7. Thereby, a plurality of cathode 300 as shown in FIG. 8 can be manufactured from the cathode sheet 300S. That is, the cathode 300 of FIG. 8 corresponds to one of several cathodes manufactured by slitting the cathode sheet 300S of FIGS. 6 and 7. By slitting the cathode uncoated portion 330 and the cathode active material portion 320 among the cathode sheet 300S, respectively, the cathode 300 in which the cathode uncoated portion 330 is extended on one side can be manufactured.

When the cathode active material portion 320 is formed, a slurry containing the cathode active material can be applied onto the cathode current collector 310, and in this slurry application process, a cathode boundary portion 320B, where the loading amount decreases as it goes toward the direction in which the cathode uncoated portion 330 is positioned, may be formed at the boundary between the cathode active material portion 320 and the cathode uncoated portion 330.

Then, referring to FIGS. 1, 5 and 8 together, a step of rolling the manufactured anode 200 and cathode 300 together with the separator 400 to form the jelly roll structure 100S may be followed. At this time, in the jelly roll structure 100S, the anode uncoated portion 230 may be extended more than the separator 400 in the first direction d1, and the cathode uncoated portion 330 may be extended more than the separator 400 in a second direction d2 opposite to the first direction d1.

Meanwhile, referring to FIGS. 6 to 8 again, in the method of manufacturing an electrode assembly according to an embodiment of the present disclosure, the cathode sheet 300S includes a loading reduction region 300DA in which a loading amount of the cathode active material is smaller than that of an adjacent region. The method of forming the loading reduction region 300DA is not particularly limited, and as an example, it can be formed by adjusting the degree of application of the slurry.

In the step of manufacturing the cathode 300, the loading reduction region 300DA of the cathode active material portion 320 is slitted. The slitted loading reduction region 300DA corresponds to the loading reduction portion 300D in which the loading amount of the cathode active material is smaller than that of the adjacent region in the jelly roll structure 100S shown in FIGS. 1 and 2.

Specifically, a loading reduction region 300DA where the loading amount of the cathode active material is smaller than that of an adjacent region is formed in the cathode active material portion 320 formed on the cathode sheet 300S. As shown in FIG. 7, the loading reduction region 300DA may be formed in the center of the cathode active material portion 320. Meanwhile, the loading reduction region 300DA may be configured such that the loading amount of the cathode active material gradually decreases it goes toward the central part 300C of the loading reduction region 300DA, and in the step of manufacturing the cathode 300, the loading reduction portion 300D according to the present embodiment can be provided by slitting the central part 300C of the loading reduction region 300DA.

That is, when applying the slurry containing the cathode active material, by forming the loading reduction region 300DA and slitting the central part 300C of the loading reduction region 300DA, it is possible to manufacture a plurality of cathodes 300 in which the loading reduction portion 300D is formed.

Referring to FIG. 8, a loading reduction portion 300D can be provided at one end part of the manufactured cathode 300, and a cathode uncoated portion 330 can be provided at the other end of the cathode 300 facing the one end.

Referring to FIGS. 1 and 2, when this cathode 300 is rolled to form the jelly roll structure 100S, the loading reduction portion 300D is disposed at one end part of the cathode 300 in the first direction d1, and the cathode uncoated portion 330 may be disposed at one end of the cathode 300 in the second direction d2.

Further, as the central part 300C of the loading reduction region 300DA is slitted, the loading reduction portion 300D may be formed such that the loading amount of the cathode active material gradually decreases as it goes toward the first direction d1.

Further, in the jelly roll structure 100S, the anode active material portion 220 may be positioned at a portion corresponding to the loading reduction portion 300D based on a direction perpendicular to the first direction d1. More specifically, in the jelly roll structure 100S, the anode boundary portion 220B may be positioned at a portion corresponding to the loading reduction portion 300D based on a direction perpendicular to the first direction d1.

The corresponding positional relationship between the loading reduction portion 300D and the anode boundary portion 220B is omitted because it overlaps with the contents described above.

Next, referring to FIGS. 9 to 12, the electrode assembly according to a comparative example of the present disclosure will be described, and the advantages of the electrode assembly according to the present embodiment as compared to the electrode assembly according to the present comparative example will be described.

Figure 9:
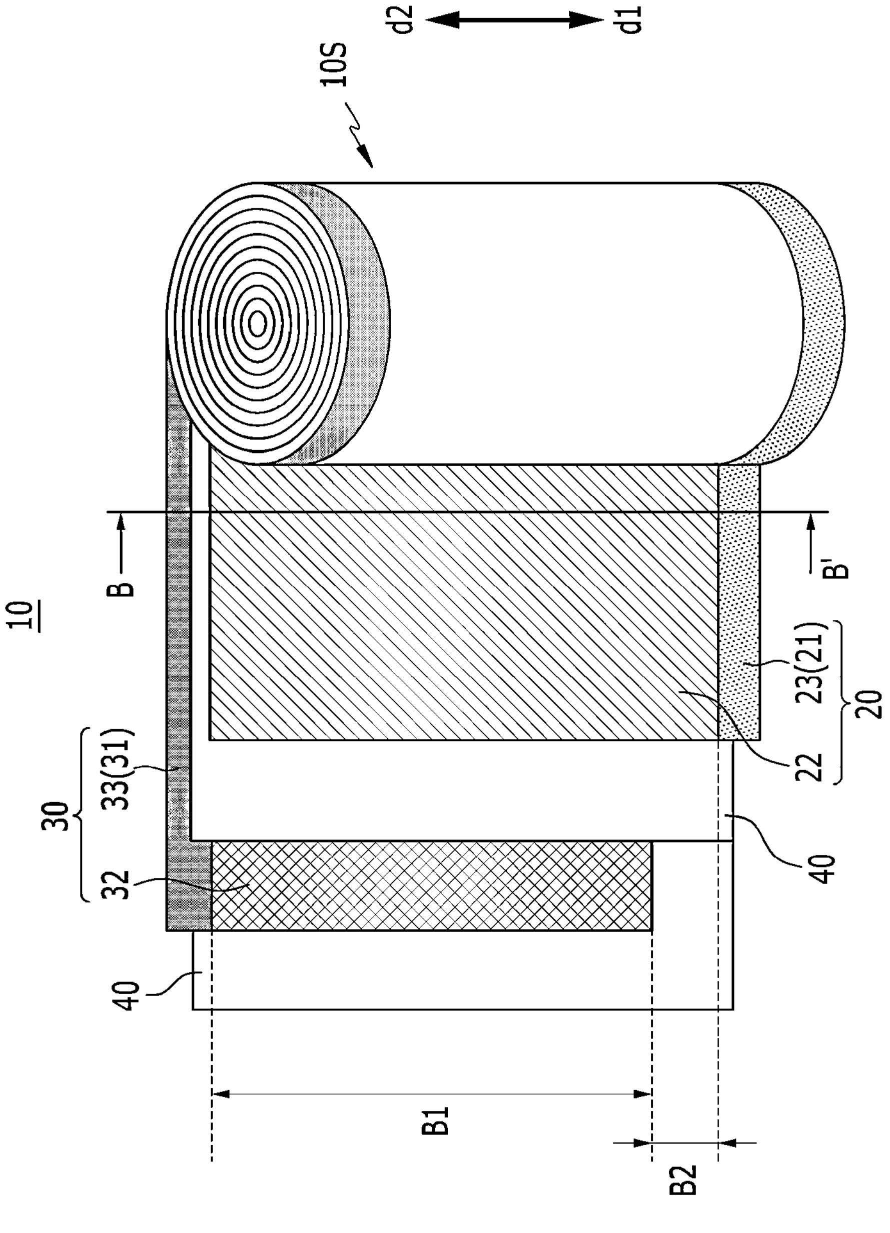
FIG. 9 is a diagram showing an electrode assembly according to a comparative example of the present disclosure.
Figure 10:
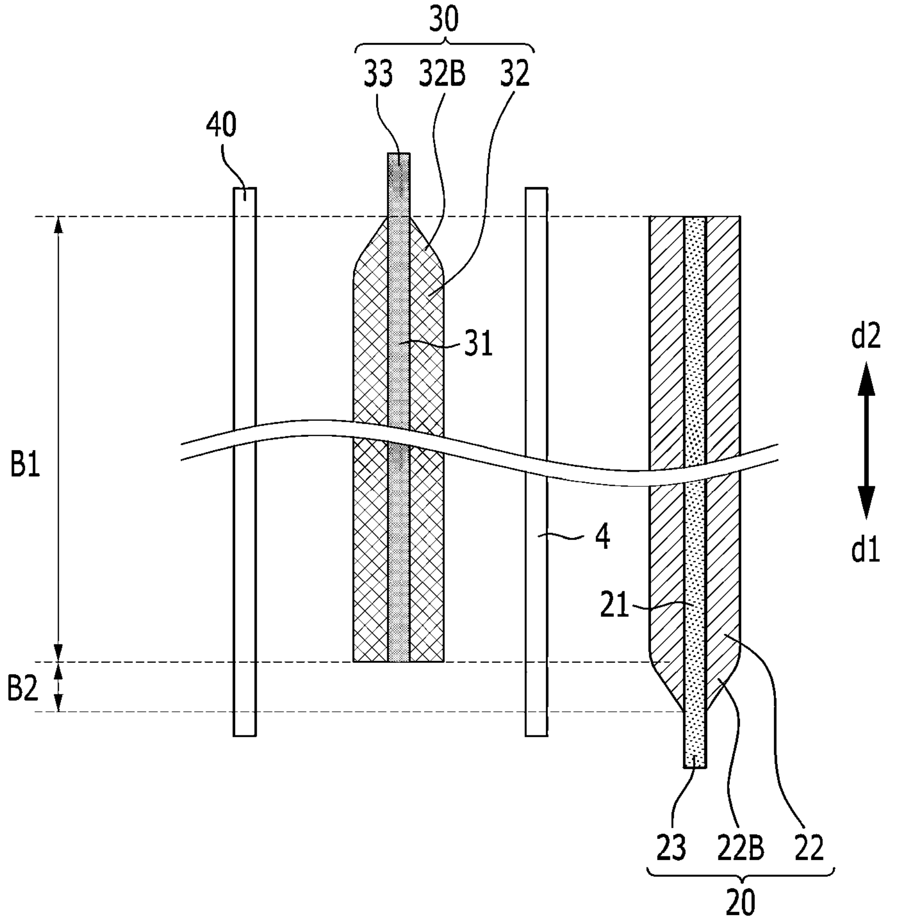
FIG. 10 is a cross-sectional view showing a cross section taken along the cutting line B-B' of FIG. 9.

FIG. 9 is a diagram showing an electrode assembly according to a comparative example of the present disclosure. FIG. 10 is a cross-sectional view showing a cross section taken along the cutting line B-B' of FIG. 9.

Referring to FIGS. 9 and 10, the electrode assembly 10 according to the comparative example of the present disclosure includes an anode 20, a cathode 30 and a separator 40, wherein the anode 20, the cathode 30 and the separator 40 are rolled to form a jelly roll structure 10S.

The anode 20 may include an anode current collector 21, an anode active material portion 22, and an anode uncoated portion 23. Further, the anode uncoated portion 23 may be extended in the first direction d1, and the anode active material portion 22 may include an anode boundary portion 22B that forms a boundary between the anode active material portion 22 and the anode uncoated portion 23 and gradually decreases the loading amount.

Figure 11:
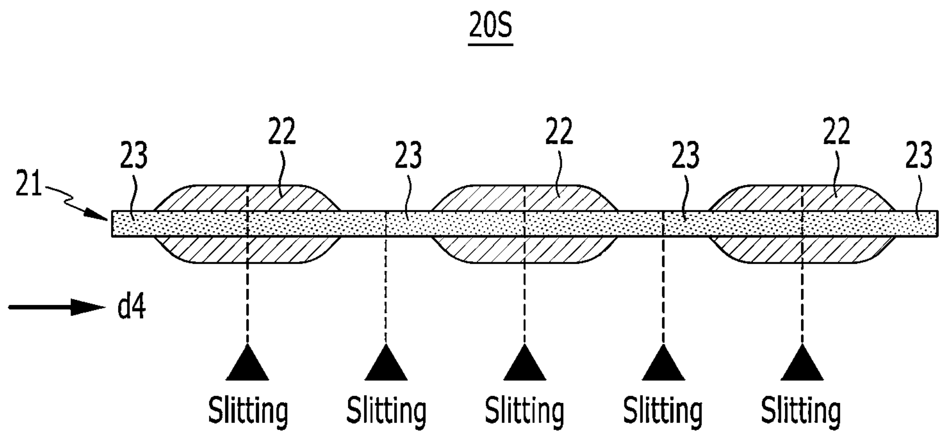
FIG. 11 is a diagram showing a state in which an anode is manufactured according to a comparative example of the present disclosure.

FIG. 11 is a diagram showing a state in which an anode is manufactured according to a comparative example of the present disclosure. Specifically, this is a diagram for explaining a process of manufacturing the anode 20 included in the electrode assembly 10 of FIGS. 9 and 10.

Referring to FIG. 11, an anode sheet 20S is manufactured such that the anode active material portion 22 and the anode uncoated portion 23 are alternately disposed along the fourth direction d4, and then the anode uncoated portion 23 and the anode active material portion 22 can be slitted to manufacture a plurality of anodes 20.

Meanwhile, referring to FIGS. 9 and 10 again, the cathode 30 may include a cathode current collector 31, a cathode active material portion 32, and a cathode uncoated portion 33. Further, the cathode uncoated portion 33 may be extended in a second direction d2 opposite to the first direction d1, and the cathode active material portion 32 may include a cathode boundary portion 32B that forms a boundary between the cathode active material portion 32 and the cathode uncoated portion 33 and gradually decreases a loading amount.

Figure 12:
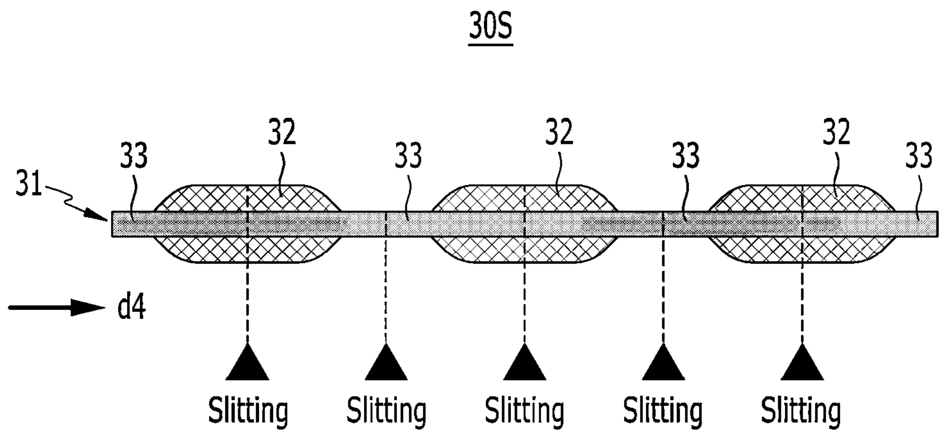
FIG. 12 is a diagram showing a state in which a cathode is manufactured according to a comparative example of the present disclosure.

FIG. 12 is a diagram showing a state in which a cathode is manufactured according to a comparative example of the present disclosure. Specifically, it is a diagram for explaining a process of manufacturing the cathode 30 included in the electrode assembly 10 of FIGS. 9 and 10.

Referring to FIG. 12, the cathode sheet 30S is manufactured such that the cathode active material portion 32 and the cathode uncoated portion 33 are alternately disposed along the fourth direction d4, and then the cathode uncoated portion 33 and the cathode active material portion 32 can slitted to manufacture a plurality of cathodes 30.

Then, the manufactured anode 20 and cathode 30 can be rolled together with the separator 40 to manufacture the electrode assembly 10 according to a comparative example of the present disclosure.

That is, the electrode assembly 10 according to the comparative example of the present disclosure may have a structure similar to that of the electrode assembly 100 according to the present embodiment. except that only the loading reduction portion 300D (see FIG. 2) is formed.

Referring to FIGS. 9 and 10, in the case of the electrode assembly 10 according to the present comparative example, the cathode active material portion 32 cannot be positioned at a portion corresponding to the anode boundary portion 22B based on a direction perpendicular to the first direction d1. If the cathode material portion 32 is extended up to a portion corresponding to the anode boundary portion 22B, the corresponding portion is a portion appearing a low N/P ratio value, and metallic lithium is highly likely to be precipitated. Therefore, in order to prevent precipitation of lithium, it is necessary to limit the length of the cathode active material portion 32. That is, the cathode active material portion 32 can be formed only in the region B1 shown, and the cathode active material portion 32 cannot be formed in the region B2. This results in a reduction in the length of the cathode active material portion 32 due to the anode boundary portion 22B.

On the other hand, referring to FIGS. 1 and 2, in the case of the electrode assembly 100 according to the present embodiment, a cathode active material portion 320, particularly a loading reduction portion 300D, can be disposed at a position corresponding to the anode boundary portion 220B based on a direction perpendicular to the first direction d1. Since the loading reduction portion 300D where the loading amount of the cathode material is smaller than that of the adjacent region is provided at a position corresponding to the anode boundary portion 220B, the N/P ratio can be maintained high in the corresponding portion, and it is possible to prevent precipitation of lithium. Thereby, the cathode active material portion 320 can be formed as much as the region A1, and the region A2 in which the cathode active material portion 320 cannot be formed can be reduced. In one example, the height direction width of the cathode 300 relative to the height direction width of the anode 200 may be increased to 98% or more.

Comparing the region A1 in FIGS. 1 and 2 with the region B1 in FIGS. 9 and 10, since the electrode assembly 100 according to the present embodiment can increase the length of the cathode material portion by the loading reduction portion 300D, it can have a higher energy density in a limited space than the electrode assembly 10 according to the comparative example.

Next, an electrode assembly according to other embodiments of the present disclosure will be described in detail with reference to FIGS. 13 and 14. Since the embodiment of FIG. 13 or FIG. 14 is similar to the previous embodiment of FIG. 2, duplicate descriptions of configurations that are substantially the same as or similar to those of the preceding embodiment are omitted, and the differences from the previous embodiment are mainly described.

Figure 13:
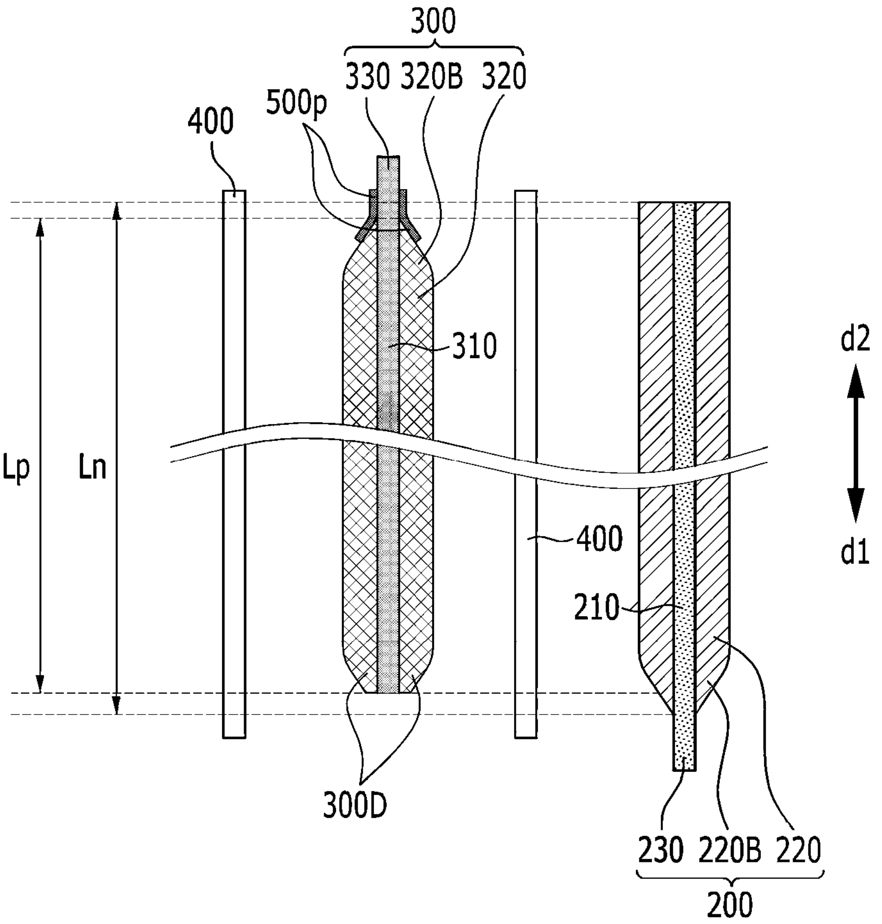
FIGS. 13 and 14 are cross-sectional views showing an anode, a cathode and separators according to other embodiments of the present disclosure, respectively.
Figure 14:
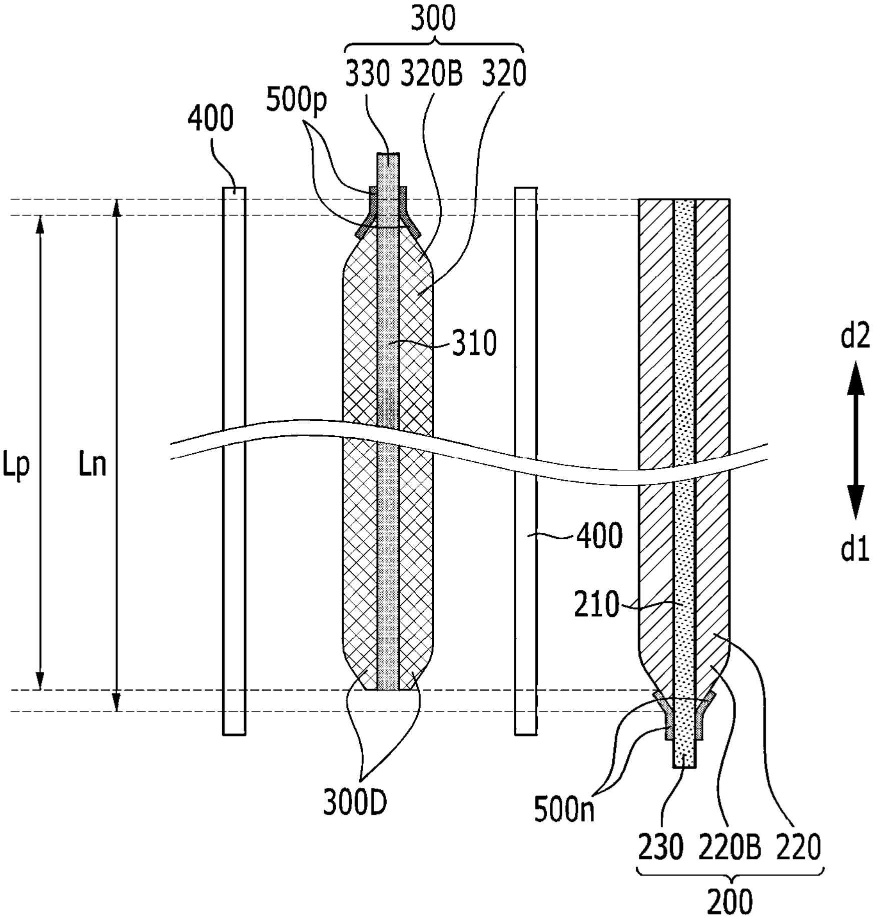

FIGS. 13 and 14 are cross-sectional views showing an anode, a cathode and separators according to other embodiments of the present disclosure, respectively.

Referring to FIGS. 13 and 14, the electrode assembly according to the present embodiment includes an anode 200, a cathode 300 and a separator 400, wherein the anode 200, the cathode 300 and the separator 400 are rolled together to form a jelly roll structure.

The anode 200 includes an anode current collector 210 and an anode active material portion 220, and the anode uncoated portion 230 is extended more than the separator 400 in the first direction d1. The cathode 300 includes a cathode current collector 310 and a cathode active material portion 320, and the cathode uncoated portion 330 is extended more than the separator 400 in the second direction d2.

Meanwhile, with respect to the height direction of the jelly roll structure described above, the length Lp of the cathode active material portion 320 may be shorter than the length Ln of the anode active material portion 220. In addition, the cathode active material portion 320 may be positioned inside the anode active material portion 220 in the height direction. For example, the length Ln in the height direction of the anode active material portion 220 may be larger than the length Lp in the height direction of the cathode active material portion 320.

Furthermore, the length Lp in the height direction of the cathode active material portion 320 may be formed shorter than the length in the height direction of the region of the anode active material portion 220 excluding the anode boundary portion 220B. This structure is intended to prevent that the above-mentioned N/P ratio is reduced to 1 or less and the lithium metal from being precipitated.

Meanwhile, the anode active material portion 220 and the cathode active material portion 320 may not protrude more than the separator 400 in the height direction. If the anode active material portion 220 and the cathode active material portion 320 protrude more than the separator 400 in the height direction, the possibility of contact between the anode 200 and the cathode 300 can be increased. If that is the case, an internal short circuit may occur in the contact area, increasing the risk of ignition. Therefore, it is important that the anode active material portion 220 and the cathode active material portion 320 do not protrude more than the separator 400 in the height direction. That is, the anode active material portion 220 and the cathode active material portion 320 are preferably positioned inside the separator 400.

Meanwhile, the electrode assembly according to the present embodiment may further include insulating layers 500*n* and 500*p* formed on at least one of the anode 200 and the cathode 300. In order to minimize the possibility of contact between the anode 200 or the cathode 300, the electrode assembly of the present disclosure may further include insulating layers 500*n* and 500*p* formed on at least one of the anode 200 and the cathode 300.

FIG. 13 illustrates an insulating layer 500*p* formed on the cathode 300. The insulating layer 500*p* formed on the cathode 300 may cover at least a part of the cathode uncoated portion 330 and the cathode active material portion 320.

Electrical contact between the anode 200 and the cathode 300 can be effectively prevented by the insulating layer 500*p*. More specifically, it is possible to effectively prevent electrical contact between the cathode uncoated portion 330 and the anode active material portion 220.

The insulating layer 500*p* may be provided on at least one surface of the cathode 300. For example, the insulating layer 500*p* may be provided on both surfaces of the cathode 300. Although not illustrated in FIG. 13, in the jelly roll structure, another portion of the rolled anode 200 is positioned on the left side of the separator 400 positioned on the left side. Therefore, in order to prevent electrical contact with the anode 200 positioned on the left and right sides, the insulating layer 500*p* is preferably provided on both surfaces of the cathode 300.

The insulating layer 500*p* can be provided in a region of the cathode 300 that is likely to face the anode active material portion 220. For example, the end part of the insulating layer 500*p* in the second direction d2 may be positioned at the same height as the end part of the separator 400 in the second direction d2 or outside the end part of the separator 400 in the second direction d2. More specifically, referring to FIG. 13 as an example, an end part of the insulating layer 500*p* in the second direction d2 may be positioned at the same height as an end part of the separator 400 in the second direction d2. Since the separator 400 is rolled between the cathode 300 and the anode 200 and protrudes along the height direction, electrical contact between the cathode 300 and the anode 200 can be prevented to some extent. However, since a flow such as meandering of the cathode 300 or the anode 200 may occur inside the secondary battery including the electrode assembly, the possibility that the anode 200 is positioned near the end part of the separator 400 cannot be excluded. Therefore, when the anode 200 is positioned up to the end of the separator 400 or the anode 200 protrudes outward more than the end of the separator 400 due to the occurrence of a flow such as meandering, electrical contact between the cathode 300 and the anode 200 becomes unavoidable. Alternatively, if the separator 400 is damaged for some reasons, electrical contact between the cathode 300 and the anode 200 becomes unavoidable.

Therefore, in order to prevent electrical contact between the cathode 300 and the anode 200 even if such a case occurs, it is preferable that the insulating layer 500*p* provided in the cathode 300 extends up to at least the same height as the end part of the separator 400 in the second direction d2 or up to the outside of the end part of the separator 400 in the second direction d2.

However, when the insulating layer 500*p* covers the entirety of the cathode uncoated portion 330, since the cathode uncoated portion 330 cannot function as an electrode tab, the insulating layer 500*p* preferably covers a part of the cathode uncoated portion 330. That is, the cathode uncoated portion 330 may have a shape that further protrudes to the outside of the insulating layer 500*p*.

The insulating layer 500*p* may be an insulating coating layer or an insulating tape provided on the boundary region between the cathode uncoated portion 330 and the cathode active material portion 320. However, the shape of the insulating layer 500*p* is not limited thereto, and can be employed in the present disclosure as long as the insulating layer 500*p* has a shape that can be attached to the cathode 300 while ensuring insulating performance. Meanwhile, the insulating layer 500*p* may include, for example, an oil-based SBR binder and alumina oxide in order to ensure insulating performance.

The insulating layer 500*p* may simultaneously cover at least a part of the cathode uncoated portion 330 and at least a part of the cathode active material portion 320. For example, the insulating layer 500*p* may be provided on a boundary region between the cathode active material portion 320 and the cathode uncoated portion 330. For example, the insulating layer 500*p* may cover at least a part of the cathode boundary portion 320B. For example, the insulating layer 500*p* can extend to a point of about 0.3~5 mm, more preferably about 1.5~3 mm from boundary point between the cathode uncoated portion 330 and the cathode active material portion 320 within the entire region of the cathode uncoated portion 330.

If the insulating layer 500*p* is absent, because an internal short circuit may occur due to the contact between the cathode 300 and the anode 200, it is preferable that the insulating layer 500*p* extends to a position where electrical contact between the cathode 300 and the anode 200 does not occur.

Meanwhile, the insulating layer 500*p* can be extended to a point of about 0.1~3 mm, more preferably about 0.2~0.5 mm from a boundary point between the cathode uncoated portion 330 and the cathode active material portion 320 within the entire region of the cathode active material portion 320.

When the insulating layer 500*p* covers a part of the cathode active material portion 320, the capacity loss of the battery occurs and, therefore, it is necessary to minimize the cover length of the holding part of the insulating layer 500*p*. However, since the cathode active material portion 320 may be in contact with the anode 200, the insulating layer 500*p* preferably covers at least a part of the cathode active material portion 320 in order to prevent this.

Meanwhile, if described with reference to FIG. 13, the separator 400 may protrude outward from the end part of the cathode 300 in the first direction d1, and may protrude outward from the end part of the anode 200 in the second direction d2.

Meanwhile, the separator 400 does not protrude more than the end part of the anode 200 in the first direction d1. This is intended for the anode uncoated portion 230 to function as an electrode tab. Similarly, the separator 400 does not protrude more than the end part of the cathode 300 in the second direction d2. This is intended for the cathode uncoated portion 330 to function as an electrode tab.

Meanwhile, one end part of the anode 200 facing the insulating layer 500*p* with the separator 400 interposed therebetween may have a shape that does not protrude outward from one end part of the separator 400. For example, referring to FIG. 13, the cathode 300 is provided with an insulating layer 500*p*, and one end part of the anode 200 facing the insulating layer 500*p* may be positioned inside the separator 400. Therefore, even if the cathode uncoated portion 330 protrudes to the outside of the separator 400, since one end part of the anode 200 is positioned inside the separator 400, the possibility of contact between the cathode 300 and the anode 200 is greatly reduced.

In FIG. 14, not only the insulating layer 500*p* formed on the cathode 300 but also the insulating layer 500*n* formed on the anode 200 are illustrated. Of course, although not illustrated, as another embodiment, an insulating layer formed only on the anode 200 is also included in the present disclosure. The insulating layer 500*n* formed on the anode 200 may cover at least a part of the anode uncoated portion 230 and the anode active material portion 220. The insulating layer 500*n* may simultaneously cover at least a part of the anode uncoated portion 230 and at least a part of the anode active material portion 220. For example, the insulating layer 500*n* may be provided on a boundary region between the anode active material portion 220 and the anode uncoated portion 230. For example, the insulating layer 500*n* may cover at least a part of the anode boundary portion 220B.

A configuration similar to that of the insulating layer 500*p* to be formed on the cathode 300 described above can be applied to the insulating layer 500*n* formed on the anode. In the following, duplicate descriptions will be omitted and differences from the previous embodiment will be mainly described.

Based on a direction perpendicular to the first direction d1, the insulating layer 500*n* formed on the anode 200 may be positioned at a place that does not overlap the loading reduction portion 300D of the cathode 300. A portion where the insulating layer 500*n* is formed based on a direction perpendicular to the first direction d1 is an unreacted region. Therefore, if the insulating layer 500*n* is positioned at a place that overlaps the loading reduction portion 300D based on a direction perpendicular to the first direction d1, the capacity loss of the battery occurs as much as that amount, and the reason to provide the loading reduction portion 300D disappears. Therefore, as shown in FIG. 14, the insulating layer 500*n* covering at least a part of the anode boundary portion 220B can be positioned so as not to overlap with the loading reduction portion 300D based on a direction perpendicular to the first direction d1, thereby intending to prevent capacity loss of the battery.

Next, an electrode assembly according to other embodiments of the present disclosure will be described in detail with reference to FIGS. 15 to 18 and the like.

Figure 15:
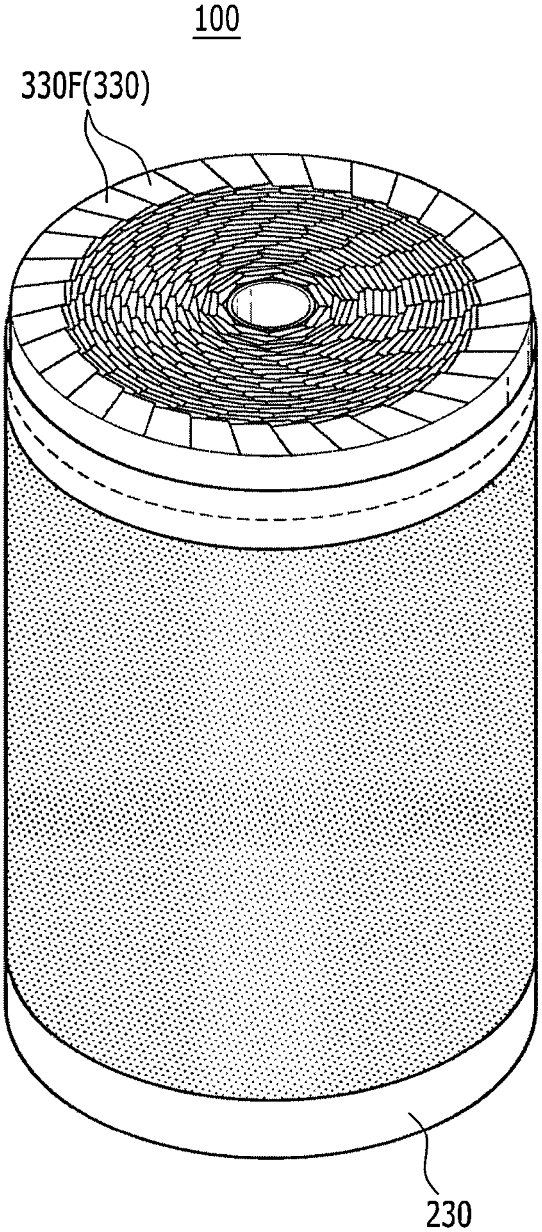
FIG. 15 is a perspective view showing an electrode assembly according to another embodiment of the present disclosure.
Figure 16:
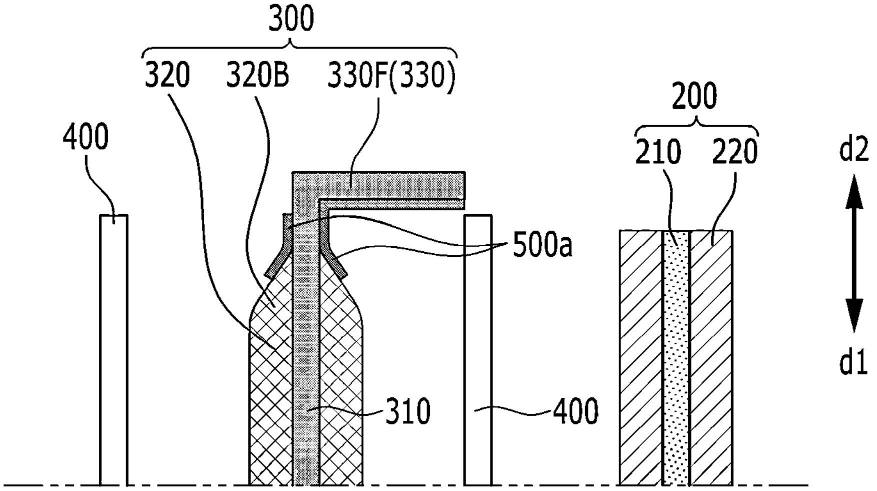
FIGS. 16 to 18 are cross-sectional views showing an anode, a cathode, and separators according to other embodiments of the present disclosure, respectively.
Figure 17:
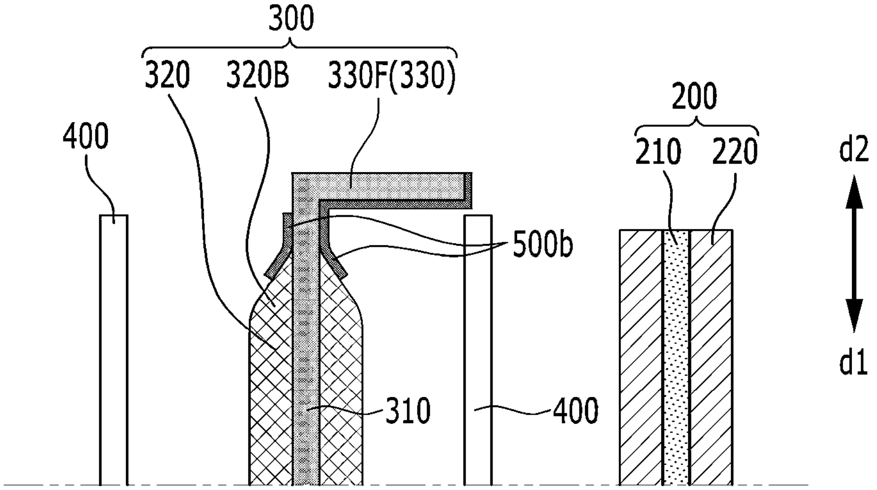
Figure 18:
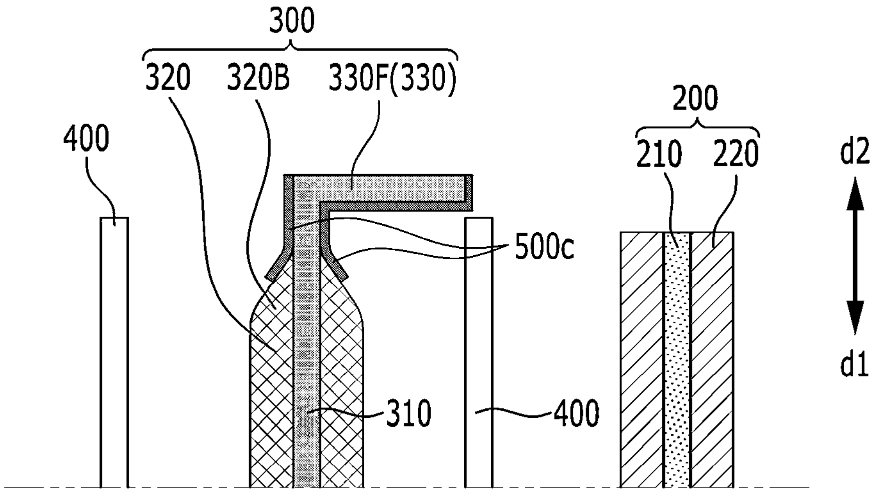

FIG. 15 is a perspective view showing an electrode assembly according to another embodiment of the present disclosure. FIGS. 16 to 18 are cross-sectional views showing an anode, a cathode, and separators according to other embodiments of the present disclosure, respectively.

First, referring to FIGS. 15 and 16, the electrode assembly 100 according to another embodiment of the present disclosure may have a structure in which at least a part of the cathode uncoated portion 330 or the anode uncoated portion 230 is bent toward the rolling center of the jelly roll structure.

At least partial sections of the anode uncoated portion 230 and the cathode uncoated portion 330 may be processed in the form of a plurality of segment pieces that can be bent independently of each other. FIGS. 15 and 16 show that at least partial sections of the cathode uncoated portion 330 are processed in the form of a plurality of segment pieces 330F that can be bent independently of each other. Here, the plurality of segment pieces 330F may have a structure that overlaps multiple layers while being bent toward the rolling center side. For example, the plurality of segment pieces 330F may be notched with a laser. The segment piece 330F can be formed by a known metal foil cutting process such as ultrasonic cutting or punching.

In the following, the segment pieces 330F of the cathode uncoated portion 330 is mainly described, but the same or similar structures can be applied to the anode uncoated portion 230.

In order to prevent the active material layer and/or the insulating layer 500*a* from being damaged during bending of the cathode uncoated portion 330, it is preferable to provide a predetermined gap between the lower end of the cutting line among the fragment pieces 330F and the active material layer. This is because stress is concentrated near the lower end of the cutting line when the cathode uncoated portion 330 is bent. This gap is preferably 0.2 to 4 mm. When the gap is adjusted to the corresponding numerical range, it is possible to prevent the active material layer and/or the insulating layer 500*a* near the lower end of the cutting line from being damaged by stress generated during bending of the cathode uncoated portion 330. Further, the gap can prevent damage to the active material layer and/or the insulating layer 500*a* due to tolerances during notching or cutting of the segment pieces.

The bending direction of the cathode uncoated portion 330 may be a direction toward the rolling center of the jelly roll structure. When the cathode uncoated portion 330 has such a bent shape, spaces in the upper and lower directions occupied by the cathode uncoated portion 330 may be reduced, thereby improving the energy density. In addition, the increased coupling area between the cathode uncoated portion 330 and the current collector (not shown) can improve the coupling force and reduce the resistance.

In FIGS. 15 and 16, a state in which the segment piece 330F of the cathode uncoated portion 330 is bent in one direction is illustrated. The one direction may be a direction toward a rolling center of the jelly roll structure as described above.

The cathode uncoated portion 330 can be adjacent to the anode 200 side beyond the separator 400. Therefore, it is preferable that the insulating layer 500*a* extends to the end of the cathode uncoated portion 330 on the surface facing the rolling center side among both surfaces of the cathode uncoated portion 330. According to such a structure, even if the cathode uncoated portion 330 is bent toward the rolling center side and is close to the anode 200 side beyond the separator 400, electrical contact between the cathode 300 and the anode 200 can be prevented. Therefore, an internal short circuit of the secondary battery can be effectively prevented.

Meanwhile, among both surfaces of the cathode uncoated portion 330, the surface opposite to the surface facing the rolling center side can be provided with the insulating layer 500*a* in only a partial region. That is, the cathode uncoated portion 330 can be exposed to the outside in the remaining partial region of the surface opposite to the surface facing the rolling center side of both surfaces of the cathode uncoated portion 330. This allows electrical contact with an adjacent current collector plate (not shown). That is, the cathode uncoated portion 330 is exposed in the region that is not covered by the insulating layer 500*a* among the entire region of the cathode uncoated portion 330 and can be electrically coupled to the current collector plate. Further, the cathode uncoated portion 330 can be coupled to the current collector plate by welding in a region not covered by the insulating layer 500*a* among the entire region of the cathode uncoated portion 330. The welding may be, for example, laser welding. The laser welding can be performed in a way that partially melts the current collector plate base material, and may also be performed in a state in which solder for welding is interposed between the current collector plate and the cathode uncoated portion 330. In this case, the solder preferably has a lower melting point as compared to the current collector plate and the cathode uncoated portion 330. Meanwhile, in addition to laser welding, resistance welding, ultrasonic welding, etc. are possible, but the welding method is not limited thereto.

Referring to FIG. 17, the insulating layer 500*b* may have a shape that wraps around the end of the cathode uncoated portion 330. Specifically, the insulating layer 500*b* may have a structure that wraps around the end surface of the cathode uncoated portion 330. For example, when the length of the bent segment pieces 330F of the cathode uncoated portion 330 is long, the possibility of contact with the anode 200 increases. Furthermore, the bent segment pieces 330F may be further bent by flow or external pressure. At this time, the possibility that the end surface of the cathode uncoated portion 330 is in contact with the anode 200 increases. However, according to the above configuration of the present disclosure, even if the cathode uncoated portion 330 is further bent or deformed, the insulating layer 500*b* covers the end surface of the cathode uncoated portion 330, and therefore, electrical contact between the cathode 300 and the anode 200 can be prevented.

Referring to FIG. 18, the insulating layer 500*c* can extend up to a bending point of the cathode uncoated portion 330 on the surface opposite to the surface facing the rolling center side of both surfaces of the cathode uncoated portion 330. Although not illustrated in FIG. 18, in the jelly roll structure, another portion of the rolled anode 200 is positioned on the left side of the separator 400 positioned on the left side. That is, the cathode 300 has a possibility of making electrical contact not only with the portion of the anode 200 positioned on the right side of the cathode 300, but also with the anode 200 positioned on the left side of the cathode 300. However, according to the above configuration of the present disclosure, electrical contact with the anode 200 positioned on both sides of the cathode 300 can be reliably prevented.

Meanwhile, the electrode assembly according to the present embodiment may be housed in a battery that is opened on one side. The material of the battery can may be aluminum. Such a battery can may be electrically connected to the electrode assembly. The battery can may be electrically connected to one of the cathode 300 and the anode 200. For example, the battery can be electrically connected to the anode 200 of the electrode assembly. In this case, the battery can have the same polarity as the anode 200. The anode uncoated portion 230 of the anode 200 may be electrically connected to the current collector and finally electrically connected to the battery can.

Meanwhile, a terminal passing through the central part of the closed end formed in the battery can is provided, and this terminal may be electrically connected to the other one of the cathode 300 and the anode 200. For example, the terminal may be electrically connected to the cathode 300. In this case, the terminal may have the same polarity as the cathode 300. The cathode uncoated portion 330 of the cathode 300 may be electrically connected to the current collector plate and finally electrically connected to the terminal.

In addition, the battery can and the terminal are electrically insulated from each other. Electrical insulation between the terminal and the battery can may be realized in various ways. For example, insulation can be realized by interposing an insulating gasket between the terminal and the battery can.

Meanwhile, the secondary battery cell including the electrode assembly according to the present embodiment may be, for example, a secondary battery cell having a form factor ratio (defined as the ratio of the diameter of the secondary battery cell divided by the height, that is, the ratio of the diameter (D) to the height (H)) of greater than about 0.4.

Here, the form factor means a value indicating the diameter and height of the secondary battery cell. The secondary battery cell according to an embodiment of the present disclosure may be, for example, a 46110 cell, a 48750 cell, a 48110 cell, a 48800 cell, or a 46800 cell. In the numerical value representing the form factor, the two preceding numbers represent the diameter of the cell, and the next two numbers represent the height of the cell, and the last number 0 represents that the cross section of the cell is circular.

The secondary battery cell according to an embodiment of the present disclosure may be a cylindrical battery cell having a substantially cylindrical shape, which may be a cylindrical battery cell having a diameter of about 46 mm, a height of about 110 mm, and a form factor ratio of about 0.418.

A secondary battery cell according to another embodiment may be a cylindrical battery cell having a substantially cylindrical shape, which may be a cylindrical battery cell having a diameter of about 48 mm, a height of about 75 mm, and a form factor ratio of about 0.640.

A secondary battery cell according to yet another embodiment may be a cylindrical battery cell having a substantially cylindrical shape, which may be a cylindrical battery cell having a diameter of about 48 mm, a height of about 110 mm, and a form factor ratio of about 0.418.

A secondary battery cell according to yet another embodiment may be a cylindrical battery cell having a substantially cylindrical shape, which may be a cylindrical battery cell having a diameter of about 48 mm, a height of about 80 mm, and a form factor ratio of about 0.600.

A secondary battery cell according to yet another embodiment may be a cylindrical battery cell having a substantially cylindrical shape, which may be a cylindrical battery cell having a diameter of about 46 mm, a height of about 80 mm, and a form factor ratio of about 0.575.

Conventionally, secondary battery cells having a form factor ratio of about 0.4 or less have been used. That is, conventionally, for example, 18650 cells, 21700 cells, and the like have been used. For the 18650 cells, the diameter is about 18 mm, the height is about 65 mm, and the form factor ratio is about 0.277. For the 21700 cells, the diameter is about 21 mm, the height is about 70 mm, and the form factor ratio is about 0.300.

The terms representing directions such as the front side, the rear side, the left side, the right side, the upper side, and the lower side have been used in embodiments of the present disclosure, but the terms used are provided simply for convenience of description and may become different according to the position of an object, the position of an observer, or the like.

The electrode assembly according to the present embodiment described above can be housed in a battery can to form a battery cell. A plurality of such battery cells can be gathered to constitute a battery module, and the battery module can be mounted together with various control and protection systems such as a BMS (battery management system), and a cooling system to form a battery pack.

The battery cell, the battery module or the battery pack can be applied to various devices. For example, it can be applied to vehicle means such as an electric bike, an electric vehicle, and a hybrid electric vehicle, and may be applied to various devices capable of using a secondary battery, without being limited thereto.

Although preferred embodiments of the present disclosure have been described in detail above, the scope of the present disclosure is not limited thereto, and various modifications and improvements can be made by those skilled in the art using the basic concepts of the present disclosure, which are defined in the appended claims, which also falls within the scope of the present disclosure.

DESCRIPTION OF REFERENCE NUMERALS

100: electrode assembly
200: anode
300: cathode
400: separator
300D: loading reduction portion

The invention claimed is:

1. An electrode assembly comprising:

an anode;

a cathode; and a separator between the anode and the cathode, wherein the anode, the cathode and the separator are rolled together, wherein the anode includes an anode current collector and an anode active material portion having an anode active material applied onto the anode current collector, wherein the cathode includes a cathode current collector and a cathode active material portion having a cathode active material applied onto the cathode current collector, wherein an anode uncoated portion of the anode current collector at which the anode active material is not applied extends in a first direction, wherein a cathode uncoated portion of the cathode current collector at which the cathode active material is not applied extends in a second direction opposite to the first direction, wherein the anode active material portion includes main portion having a constant thickness of anode active material and an anode boundary portion at a boundary area between the main portion and the anode uncoated portion in which an applied amount of the anode active material decreases in a direction toward the anode uncoated portion, wherein the cathode active material portion includes a loading reduction portion in which a loading amount of the cathode active material is smaller than that of an adjacent region of the cathode active material portion such that, in a region corresponding to the anode boundary portion, an amount of the anode active material is greater than an amount of the cathode active material, and wherein the loading reduction portion is at one end part of the cathode in the first direction.

2. The electrode assembly according to claim 1, wherein the anode active material portion is at a portion corresponding to the loading reduction portion based on a direction perpendicular to the first direction.

3. The electrode assembly according to claim 1, wherein the anode boundary portion is at a portion corresponding to the loading reduction portion, based on a direction perpendicular to the first direction.

4. The electrode assembly according to claim 1, wherein, in the loading reduction portion, the loading amount of the cathode active material gradually decreases in the first direction.

5. The electrode assembly according to claim 1, wherein the first direction and the second direction are directions parallel to an axis of the rolled anode, cathode, and separator.

6. The electrode assembly according to claim 1, wherein:

the anode uncoated portion extends more than the separator in the first direction, and the cathode uncoated portion extends more than the separator in the second direction.

7. The electrode assembly according to claim 1, further comprising an insulating layer on at least one of the anode and the cathode, wherein the insulating layer on the anode covers at least a part of the anode uncoated portion and the anode active material portion, and wherein the insulating layer on the cathode covers at least a part of the cathode uncoated portion and the cathode active material portion.

8. The electrode assembly according to claim 7, wherein:

the insulating layer on the anode covers an end part of the anode active material portion along the first direction and a part of the anode uncoated portion adjacent thereto, and the insulating layer on the cathode covers an end part of the cathode active material portion along the second direction and a part of the cathode uncoated portion adjacent thereto.

9. The electrode assembly according to claim 7, wherein the insulating layer on the anode does not overlap with the loading reduction portion, with respect to a direction perpendicular to the first direction.

10. The electrode assembly according to claim 1, wherein at least partial sections of the anode uncoated portion and the cathode uncoated portion include a plurality of segment pieces configured to be bent independently of each other.

11. The electrode assembly according to claim 1, wherein the adjacent region of the cathode active material portion has a constant thickness of cathode active material, wherein the anode active material portion overlaps the loading reduction portion based on a direction perpendicular to the first direction, and wherein the anode active material portion extends further in the first direction than the loading reduction portion.

12. The electrode assembly according to claim 1, wherein the electrode assembly has an N/P ratio greater than 1 in the region corresponding to the anode boundary portion.

* * * * *